US006983759B2

(12) United States Patent
Maichel et al.

(10) Patent No.: US 6,983,759 B2
(45) Date of Patent: Jan. 10, 2006

(54) VALVE AND METHOD FOR REPAIRING A VALVE UNDER PRESSURE

(75) Inventors: Jeffrey L. Maichel, Temecula, CA (US); Thomas A. Sovilla, La Habra, CA (US)

(73) Assignee: Occlude, La Mirada, CA (US)

( * ) Notice: Subject to any disclaimer, the term of this patent is extended or adjusted under 35 U.S.C. 154(b) by 138 days.

(21) Appl. No.: 10/632,006

(22) Filed: Jul. 31, 2003

(65) Prior Publication Data

US 2005/0022867 A1    Feb. 3, 2005

(51) Int. Cl.
    *F16K 43/00*    (2006.01)
(52) U.S. Cl. .......................... 137/315.41; 137/315.42; 137/315.29
(58) Field of Classification Search ............. 137/15.17, 137/15.08, 15.18, 15.23, 315.41, 315.27, 137/315.29, 315.3, 315.31, 315.32, 315.42; 251/326, 328, 329
    See application file for complete search history.

(56) References Cited

U.S. PATENT DOCUMENTS

| 2,547,831 | A | 4/1951 | Mueller |
|---|---|---|---|
| 2,621,888 | A | 12/1952 | Allen |
| 2,688,987 | A | 9/1954 | Whalen |
| 2,936,778 | A | 5/1960 | Stillwagon |
| 3,128,987 | A | 4/1964 | O'Connor |
| 3,295,550 | A | 1/1967 | Scaramucci |
| 3,809,114 | A | 5/1974 | Mueller et al. |
| 3,948,282 | A | 4/1976 | Yano |
| 3,991,791 | A | 11/1976 | Luckenbill |
| 4,286,364 | A | 9/1981 | Connolly |
| 4,460,012 | A | 7/1984 | Koumi et al. |
| 4,513,788 | A | 4/1985 | Coker et al. |
| 4,516,598 | A | 5/1985 | Stupak |
| 4,562,860 | A | 1/1986 | Walter et al. |
| 5,074,526 | A | 12/1991 | Ragsdale et al. |
| 6,247,489 | B1 | 6/2001 | Maskell et al. |
| 6,357,471 | B1 | 3/2002 | Sato et al. |
| 6,470,907 | B1 * | 10/2002 | Sato et al. ............. 137/315.41 |

* cited by examiner

*Primary Examiner*—Kevin Lee
(74) *Attorney, Agent, or Firm*—Loyal McKinley Hanson

(57) ABSTRACT

A valve includes a valve body with a hollow valve body interior and an opening-defining portion that defines an access opening. The opening-defining portion is arranged as a connection-facilitating structure for facilitating the fluid-tight connection of a separate isolation valve assembly to the opening-defining portion in a position over the access opening that enables removal and replacement of a valve-stopping mechanism from the valve through the isolation valve assembly. It may include a flange, exterior thread, one or more annular grooves or rings, and/or a segmented cam lock arrangement. The associated method includes (i) providing a valve-servicing assembly having an isolation valve assembly and an attached chamber-defining structure that defines a fluid-tight pressure chamber in which the valve-stopping mechanism fits, (ii) connecting the auxiliary valve assembly to the opening-defining portion of the valve body, and (iii) withdrawing the valve-stopping mechanism through the isolation valve assembly into the pressure chamber.

24 Claims, 12 Drawing Sheets

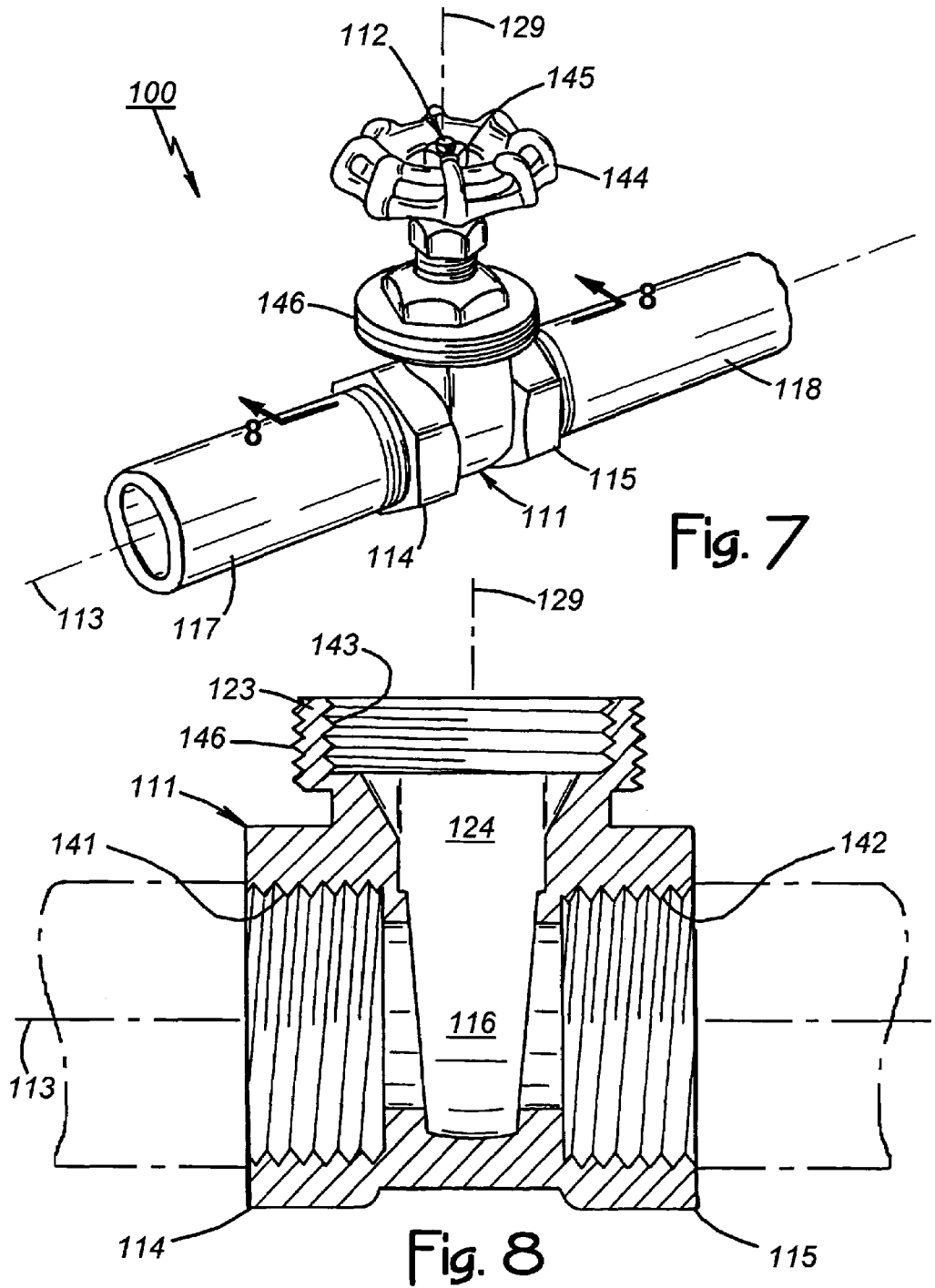

VALVE AND METHOD FOR REPAIRING A VALVE UNDER PRESSURE

BACKGROUND OF THE INVENTION

1. Technical Field

This invention relates generally to valves for lines carrying water, sewage, natural gas, or other fluid, and more particularly to a valve and method for repairing a valve under pressure without first shutting down the line.

2. Description of Related Art

A typical valve may be manufactured from any of various materials, including ductile iron, cast iron, stainless steel, brass, plastics, and/or any of various exotic materials needed in special applications. The size can range from ¼-inch diameter or less to a 144-inch diameter or more. The valve may include a one-piece valve body with a hollow interior that extends between first and second ends of the valve body. The first and second ends are threaded, flanged, grooved, or otherwise configured so that a user can readily connect each end to a respective one of separate first and second pipeline sections, either directly or via intermediate fittings. In that regard, the term "pipeline" includes any type, size, and composition of fluid-carrying conduit, and the hollow valve body interior couples the first and second pipeline sections in fluid communications.

What is sometimes called a valve-stopping mechanism is mounted in the valve body. More specifically, part of the valve body defines an opening in the valve body that provides access to the hollow valve body interior. The valve-stopping mechanism is removably mounted within that opening in fluid-tight engagement of the valve body. There, it functions as means for enabling the user to selectively stop and unstop fluid communications between the first and second pipeline sections (i.e., between the first and second ends of the valve body). The opening in the valve body will subsequently be referred to as an "access opening," and the portion of the valve body that defines the access opening will subsequently be referred to as an "opening-defining portion" of the valve body. The valve-stopping mechanism is sometimes called a user-operated, isolator mechanism or valving element. Known valve-stopping mechanisms include metal gate, rubber coated gate, butterfly, plug, ball, and check valve stopping mechanisms, each having its own special features and advantages. In addition, the hollow interior of the valve body may include mating surfaces cast into the body or attached to the body by known valve technology to create a seating surface for the valve-stopping mechanism. Attached materials may include brass, steel, stainless steel, plastics, and other known materials.

Regardless of the particular style of the valve-stopping mechanism, a valve is prone to becoming corroded, obstructed by mineral and/or chemical deposits or debris, or otherwise damaged to the point that it requires servicing in order to clean or resurface the hollow valve body interior and/or to clean, resurface, or replace the valve-stopping mechanism. The line may have to be shut down so that the valve is not under pressure. The valve is then serviced and afterwards the line is turned back on. However, the consequences of shutting down the line may be significant. For example, shutting down a municipal water main in order to service a branch line to a subdivision results in many inconvenienced and potentially monetarily damaged water customers.

Undertaking to shut down hospital systems, manufacturing plants, hotels, or nuclear facilities is also fraught with adverse consequences, including the cost of a plant shut down or the lack of fire protection during the shut down. The problem exists with gas valves, air valves, water valves, sewage valves, steam valves, any of numerous chemical valves, and other fluid valves for above ground and below ground pipe, including sub-sea systems. Thus, a need exists for a valve and repair method such that the valve can be installed when the pipe is installed and then serviced under pressure (i.e., with the valve containing fluid under pressure) without shutting down the line.

SUMMARY OF THE INVENTION

This invention addresses the concerns outlined above by providing a valve having a valve body with an opening-defining portion that includes connection-facilitating means for facilitating the fluid-tight removable connection of what is referred to herein as a separate "isolation valve assembly" onto the opening-defining portion of the valve body. The connection-facilitating means facilitates connection of the isolation valve assembly in a position over the access opening that enables a user to remove the valve-stopping mechanism through the isolation valve assembly. A valve-servicing assembly that includes such an isolation valve assembly and an attached pressure-chamber-defining structure is used for valve-servicing purposes so that the valve-stopping mechanism can be removed from the access opening through the isolation valve assembly and into the chamber-defining structure while the valve is under pressure (i.e., the valve contains fluid under pressure). The chamber-defining structure may be similar in many respects to known equipment, and servicing or replacement of the valve-stopping mechanism and valve body cleaning can be conducted using the pressure chamber while the valve contains fluid under pressure. Thus, a shut down with all the potential adverse consequences is avoided.

To paraphrase some of the more precise language appearing in the claims and further introduce the nomenclature used, a valve constructed according to the invention includes a valve body and a valve-stopping mechanism. The valve body has first and second ends and it defines a hollow valve body interior extending between the first and second ends that couples the first and second ends in fluid communications. The valve body includes an opening-defining portion that defines an access opening in the valve body. The valve-stopping mechanism is removably mounted within the access opening where it functions as means for enabling a user to selectively stop and unstop fluid communications between the first and second ends of the valve body.

According to a major aspect of the invention, connection-facilitating means are provided on the opening-defining portion of the valve body for facilitating the fluid-tight removable connection of a separate isolation valve assembly to the opening-defining portion of the valve body. The connection-facilitating means facilitate connection of the isolation valve assembly in a position over the access opening that enables the user to remove the valve-stopping mechanism from the access opening through the isolation valve assembly. The connection-facilitating means facilitate such a connection without obstructing removal of the valve-stopping mechanism from the access opening. The connection-facilitating means may include one or more of a flange, an exterior thread, annular grooves, annular rings, or a cam lock arrangement. Other forms of connection-facilitating means may be employed within the scope of the broader claims. Whatever the form, the connection-facilitating means are part of the valve so that they are ready to use when needed.

In line with the foregoing, a method for repairing such a valve under pressure includes the step of providing a valve-servicing assembly of which the isolation valve assembly is a part. The isolation valve assembly has first and second ends and a size large enough to enable a user to remove the valve-stopping mechanism from the access opening through the isolation valve assembly. The valve-servicing assembly includes a chamber-defining structure connected to the second end of the isolation valve assembly that defines a pressure chamber (i.e., a fluid-tight chamber) in which the valve-stopping mechanism fits.

The method proceeds by connecting the first end of the isolation valve assembly to the opening-defining portion of the valve body in a position over the access opening. Next, the valve-stopping mechanism is withdrawn from the access opening, through the isolation valve assembly, into the fluid-tight chamber. Then, the isolation valve assembly is closed.

In the case of repairing the valve-stopping mechanism, the method includes removing the valve-stopping mechanism from the fluid-tight chamber and servicing the valve-stopping mechanism, placing the valve-stopping mechanism back into the fluid-tight chamber, opening the isolation valve assembly, advancing the valve-stopping mechanism from the fluid-tight chamber through the isolation valve assembly back into the access opening. In the case of replacement, the replacement valve-stopping mechanism is placed into the chamber and advanced into the access opening. In either case, the valve-servicing assembly may be removed from, or left connected to, the opening-defining portion of the valve body.

Thus, the invention significantly facilitates the repair under pressure of a valve so that the line does not have to be shut down. Preferably, the valve is installed when the pipeline is installed. When the valve requires repair, the valve-servicing assembly is connected to the opening-defining portion of the valve body and repair is undertaken under pressure. If it is desired, just a valve body with a plugged or capped access opening may be installed without the valve-stopping mechanism instead of installing the entire valve. In that case, a valve-stopping mechanism can be added under pressure if it is ever needed. The following illustrative drawings and detailed description make the foregoing and other objects, features, and advantages of the invention more apparent.

BRIEF DESCRIPTION OF THE DRAWINGS

FIG. 7 is an isometric view of a second embodiment of a valve constructed according to the invention;

FIG. 8 is an enlarged cross sectional elevation view of just the valve body of the second embodiment as viewed in a plane containing a line 8—8 and the rotational axis in FIG. 7;

DESCRIPTION OF THE PREFERRED EMBODIMENTS

Figure 1:
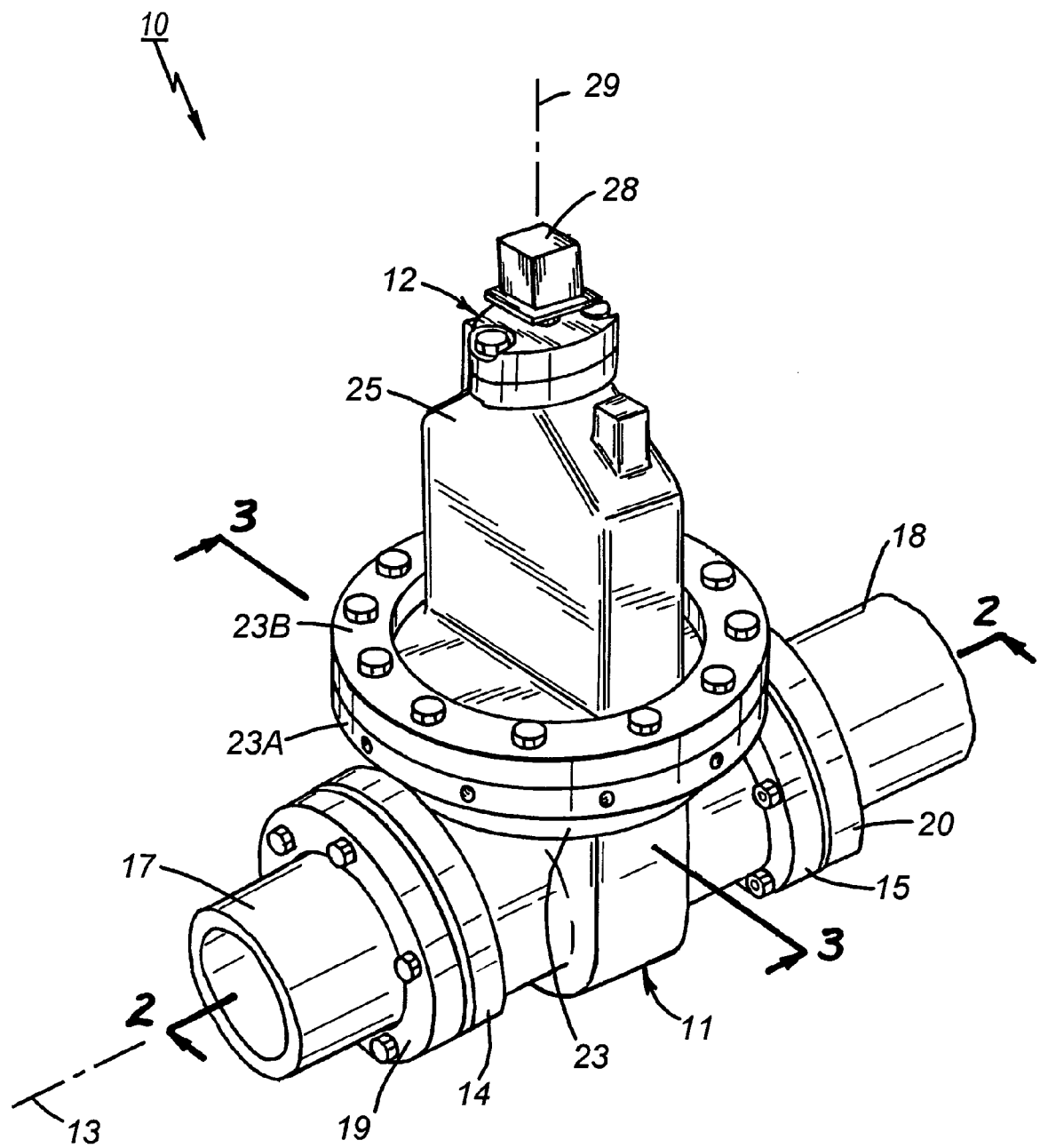
FIG. 1 of the drawings is an isometric view of a valve constructed according to the invention.
Figure 2:
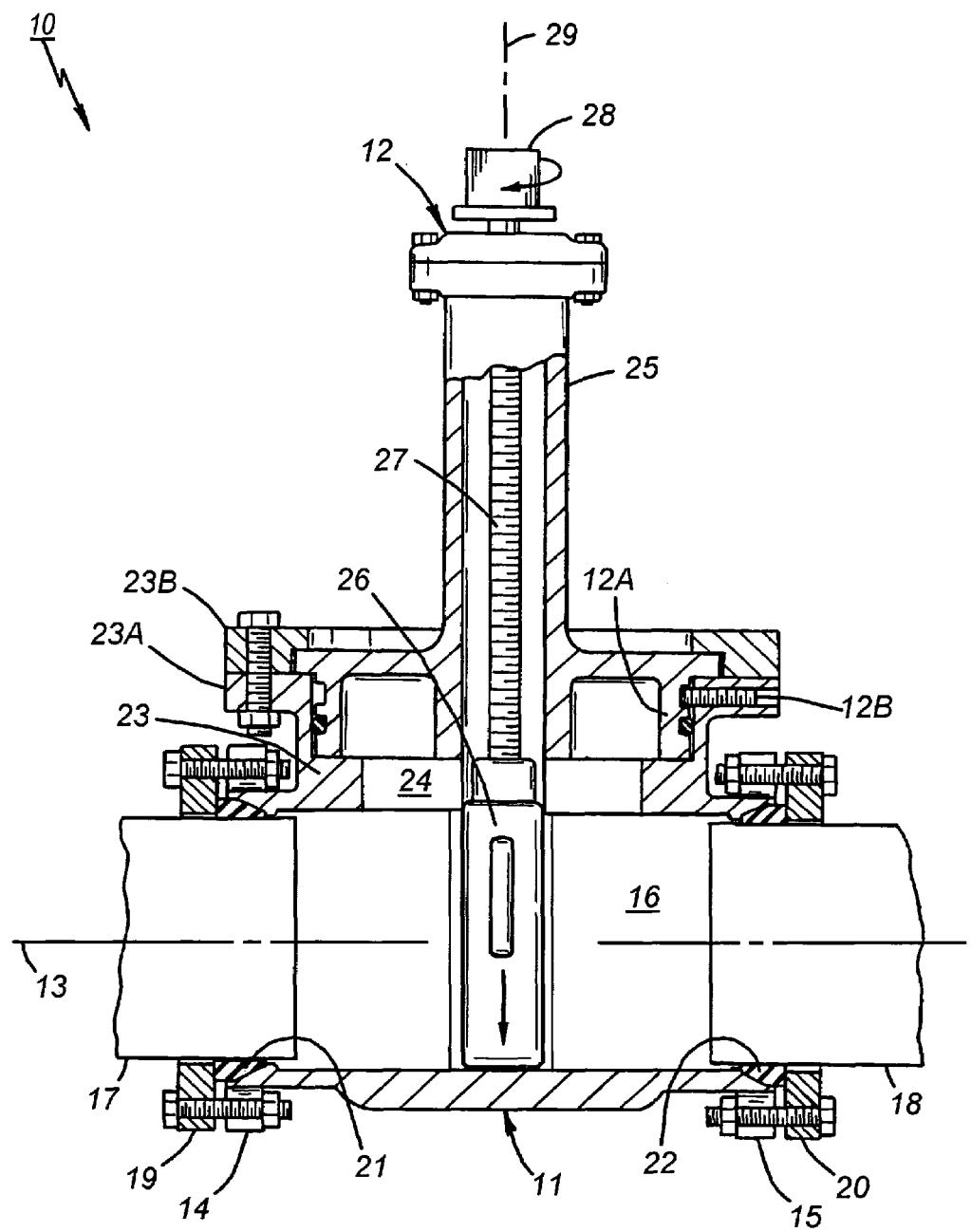
FIG. 2 is an elevation view of the valve, with portions in cross section as viewed in a plane containing a line 2—2 and the rotational axis in FIG. 1.
Figure 3:
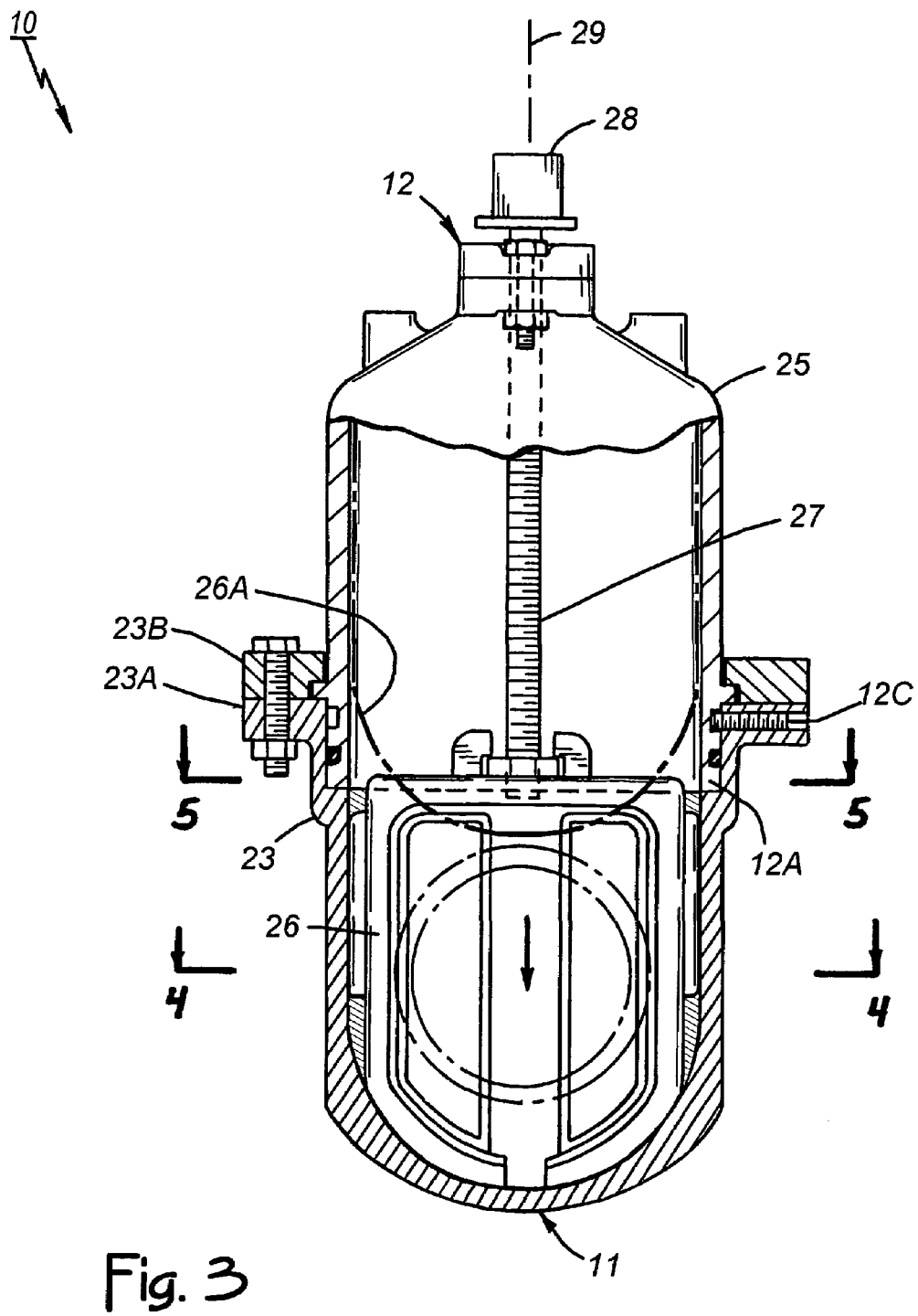
FIG. 3 is an elevation view of the valve, with portions in cross section as viewed in a plane containing a line 3—3 and the rotational axis in FIG. 1.
Figure 4:
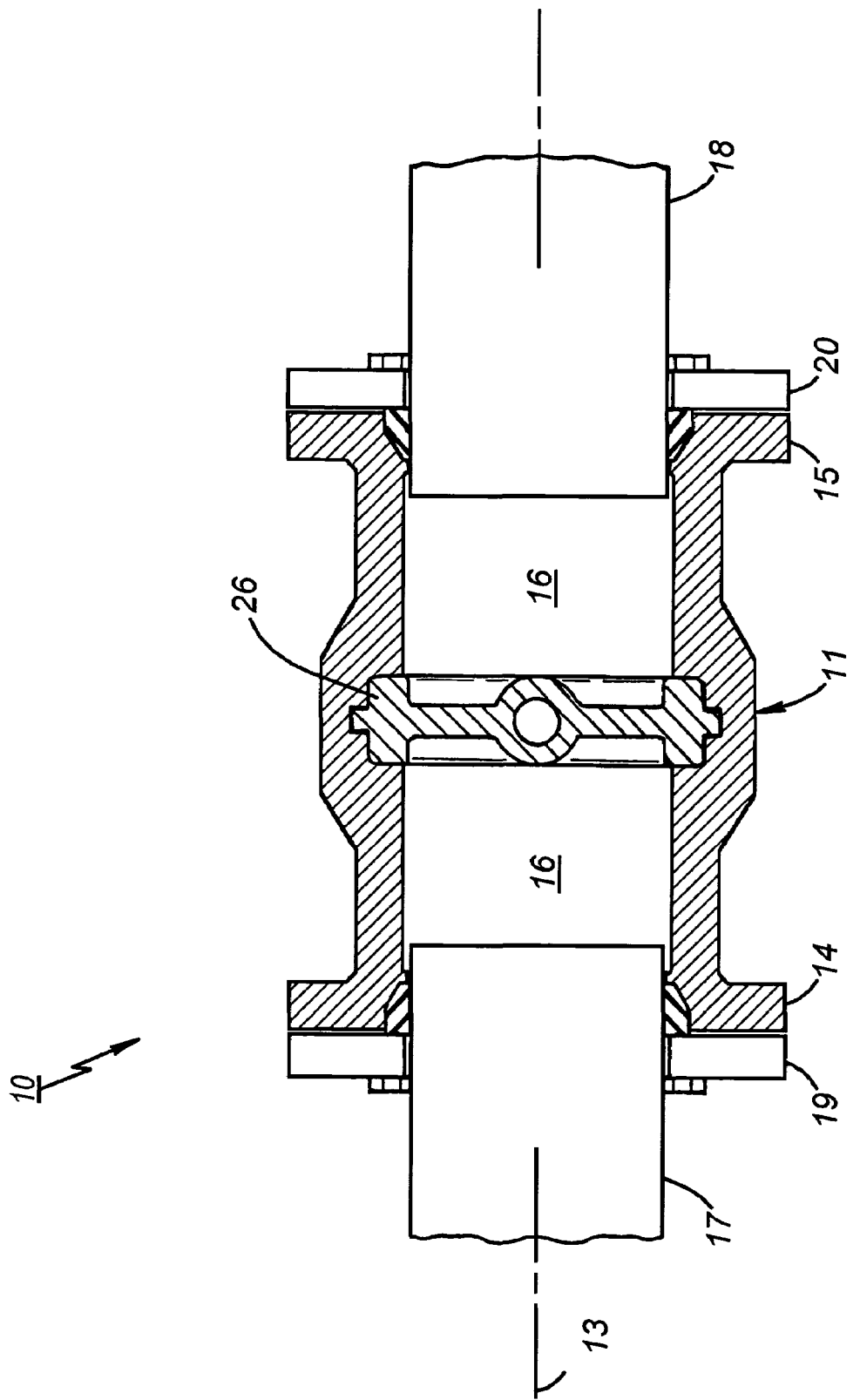
FIG. 4 is a plan view of the valve, with portions in cross section as viewed in a plane perpendicular to the rotational axis that contains a line 4—4 in FIG. 3.

FIGS. 1–5 of the drawings show various aspects of a valve 10 constructed according to the invention. Generally, the valve 10 includes first and second subassemblies referred to in this description as a valve body 11 and a valve-stopping mechanism 12 (FIGS. 1–3). The valve body 11 is preferably a one-piece structure that extends along a valve body axis 13 between first and second ends 14 and 15 of the valve body 11 (FIGS. 1–5), and it defines a hollow valve body interior 16 (FIG. 2) that couples the first and second ends 14 and 15 in fluid communications. The valve body 11 is composed of ductile iron, steel, composite material, or other suitable composition and the ends are connected to first and second pipeline sections 17 and 18. The valve body 11 may be one-piece because it is not installed over the pipeline at some later date as a retrofit. It is installed with the pipeline sections 17 and 18.

The OD of the illustrated six-inch pipeline sections 17 and 18 might typically measure about 6.5 inches to 7.75 inches, but the invention works on any of various sized pipeline with ¼-inch or less diameter up to 114-inch or larger diameter. A valve body constructed according to the invention is sized according to the pipe OD with which it will be used. The valve body 11 of the illustrated valve 10 fits the six-inch OD of the pipe 18, with the valve body 11 and the first and second pipeline sections 17 and 18 disposed coaxially relative to the valve body axis 13. Each of the first and second glands 19 and 20 (FIGS. 1 and 2) bolts onto a respective one of the first and second ends 14 and 15 of the valve body 11 where they bear against first and second split rubber seals 21 and 22 (FIG. 2) in order to seal the first and second ends 14 and 15 of the valve body 11 on the first and second pipeline sections 17 and 18 in fluid-tight connections. The glands and rubber seals may take the form of known types of components.

Figure 5:
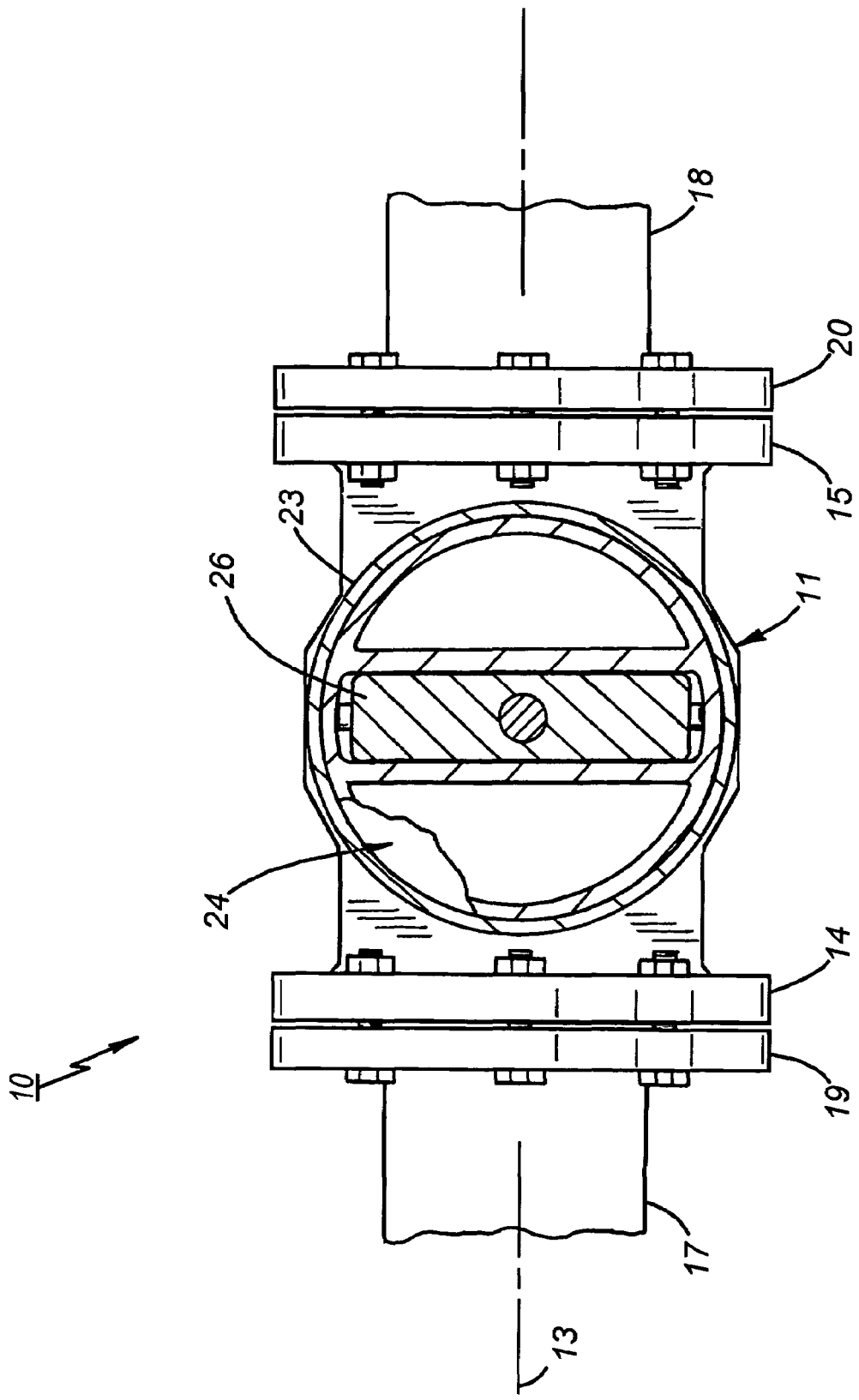
FIG. 5 is a plan view of the valve, with portions in cross section as viewed in a plane perpendicular to the rotational axis that contains a line 5—5 in FIG. 3.

The valve body 11 includes an opening-defining portion 23 that defines an access opening 24 in the valve body 11 (FIGS. 2 and 5). A portion of the valve-stopping mechanism 12 is broken away in FIG. 5 for illustrative reasons to expose the access opening 24. The valve-stopping mechanism 12 is removably mounted in the access opening 24 where it functions as means for enabling a user to selectively stop and unstop fluid communications between the first and second ends 14 and 15 of the valve body 11. The valve-stopping mechanism 12 includes a flange-mating portion 12A that is shaped and dimensioned to fit into the access opening 24 in a fluid-tight fit. The flange-mating portion 12A may include an O-ring seal. Set screws extending through a flange 23A on the opening-defining portion 23 of the valve body 11 function as means for holding or vertically restraining the valve-stopping mechanism 12 within the access opening 24. For illustrative reasons, just one set screw 12B is identified in FIG. 2 and just one other set screw 12C is identified in FIG. 3. A retainer ring 23B bolts onto the flange 23A to help secure the valve-stopping mechanism 12 in place.

The illustrated valve-stopping mechanism 12 includes a bonnet 25, a gate 26, and a gate-advancing mechanism 27 (e.g., a rotatable threaded stem and nut combination). The gate-advancing mechanism 27 functions as means for enabling a user to advance the gate 26 between open and closed positions of the gate 26. The gate-advancing mechanism 27 advances and withdraws the gate 26 in response to the user turning a square head portion 28 of the gate-advancing mechanism 27 (e.g., with a wrench or other suitable head-engaging tool). As the square head portion 28 rotates on a rotational axis 29 that is perpendicular to the valve body axis 13, the gate 26 advances or withdraws along the rotational axis 29.

In the closed position of the gate 26 illustrated in FIGS. 2–5, the gate is disposed intermediate the first and second ends 14 and 15 of the valve body 11, with the gate 26 being in fluid-tight engagement of the valve body 11 (or conventional types of seating arrangements attached to the valve body 11) and preferably in fluid-tight engagement of the flange-mating portion 12A of the valve-stopping mechanism 12. So disposed, the gate 26 blocks (stops) the flow of fluid through the valve body 11 between the first and second ends 14 and 15 and between the first and second pipeline sections 17 and 18. In the open position of the gate 26, the gate 26 does not block the flow of fluid through the valve body 11 because the gate 26 is withdrawn from the closed position as depicted by the phantom line 26A in FIG. 3.

The illustrated gate 26 is fabricated from ductile iron in the desired shape and then a rubber coating is bonded on using known transfer mold compression mold, or other techniques. The rubber coating helps effect the desired fluid-tight seal between the gate 26 and the valve body 11 and, if desired, between the gate 26 and the bonnet 25 of the valve-stopping mechanism 12 if the need arises. As an idea of size, the illustrated gate 26 (for use with six-inch pipe) measures about 9.0 inches wide.

According to a major aspect of the invention, the valve 10 includes means on the opening-defining portion 23 of the valve body 11 for facilitating the fluid-tight removable connection of a separate second valve assembly (referred to herein as an isolation valve assembly) to the opening-defining portion 23 of the valve body 11. Those means are referred to herein as connection-facilitating means and they facilitate connection of the isolation valve assembly subsequently described over the access opening 24 in a position that enables the user to remove the valve-stopping mechanism 25 from the access opening 24 through the isolation valve assembly. The connection-facilitating means facilitate such a connection without obstructing removal of the valve-stopping mechanism from the access opening 24. The flange 23A serves the connection-facilitating function for the valve 10 in addition to supporting the retainer ring 23B. In other words, the opening-defining portion 23 of the valve body 11 includes a flange 23A that functions as means for facilitating the connection of the isolation valve assembly to the opening-defining portion 23 of the valve body 11 by bolting. The user removes the retainer ring 23B from the flange 23A (unbolts it) and then bolts the isolation valve assembly to the flange 23A.

Figure 6A:
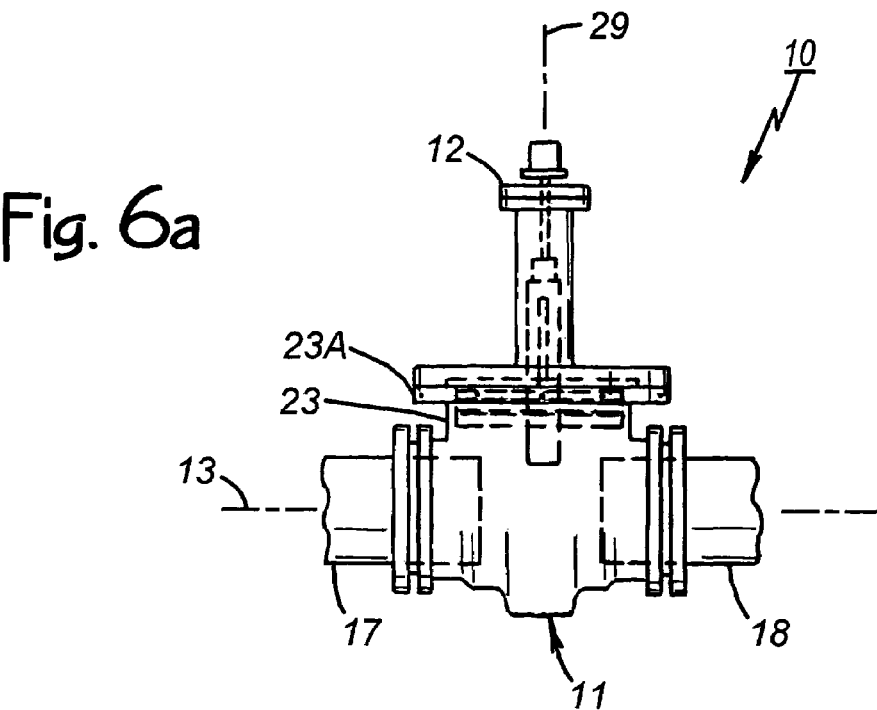
FIGS. 6a through 6g are diagrammatic representations of various steps of the valve repair methodology of the invention.
Figure 6B:
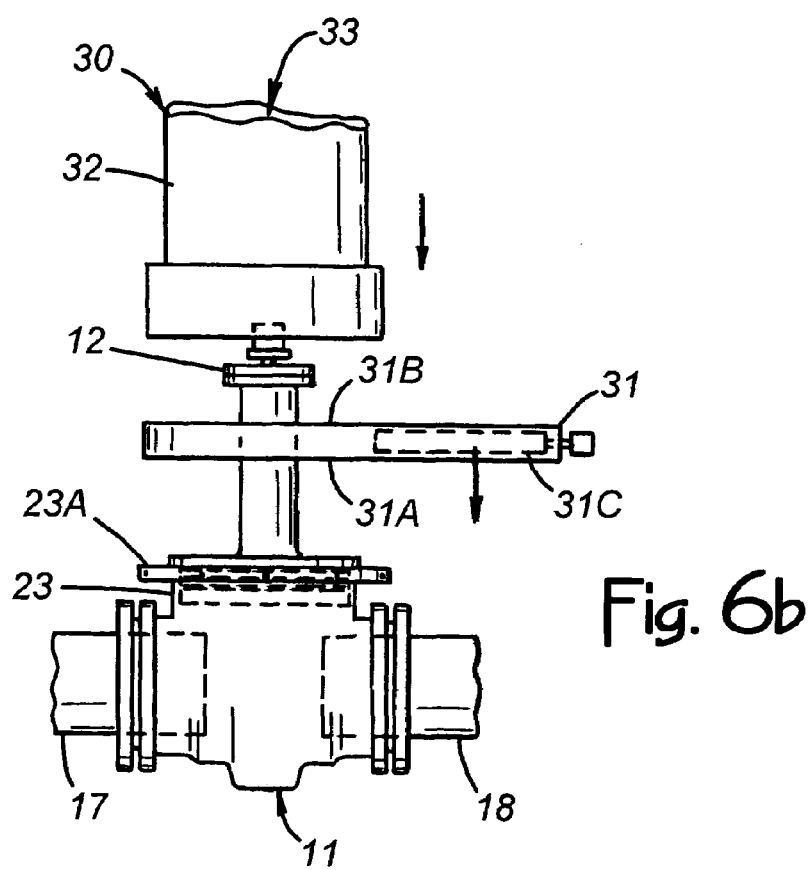

The use of a valve-servicing assembly 30 that includes an isolation valve assembly 31 and a chamber-defining structure 32 is illustrated in the diagrammatic views of FIGS. 6a–6b. First consider FIG. 6a. It shows the valve 10 installed between the first and second pipeline sections 17 and 18, and it is assumed here that the valve 10 is in need of servicing. In servicing the valve 10 according to the invention, the valve-servicing assembly 30 is connected to the flange 23A on the opening-defining portion 23 of the valve body 11. That is done for the valve 10 by bolting the isolation valve assembly 31 directly to the flange 23A. However, the term "connection" herein also includes an indirect connection via one or more intermediate fittings or other components (e.g., a size adapter fitting).

The arrows in FIG. 6b show the direction a user moves the valve-servicing assembly 30 relative to the valve 10 (along the rotational axis 29) to place it in position over the access opening 24 (described earlier with reference to FIGS. 2 and 5) in the opening-defining portion 23 of the valve body 11. That is done with the isolation valve assembly 31 open. illustrated isolation valve assembly 31 is a gate valve that includes first and second ends 31A and 31B (identified in FIG. 6b) and a gate 31C that is shown in FIG. 6b in an open position. However, any of various known types of valves can be used as an isolation valve as long as the valve-stopping mechanism can pass through it. The gate 31C can be closed to seal off the access opening 24 when desired, and opened to expose the access opening 24.

Figure 6C:
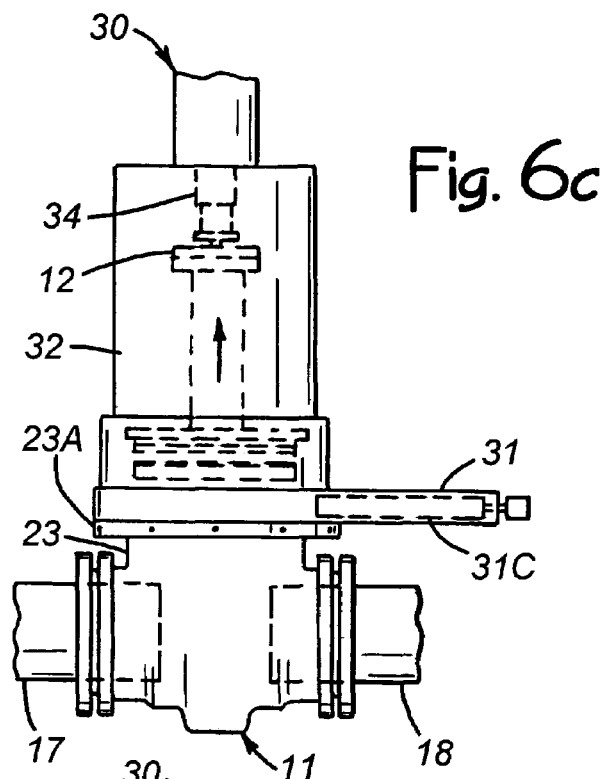

The chamber-defining structure 32 connects to the second end 31B of the isolation valve assembly 31 to form the valve-servicing assembly 30. With the valve-servicing assembly 30 connected in fluid-tight engagement of the flange 23A by connection of the first end 31A of the isolation valve assembly 31 to the flange 23A, and with the gate 31C in an open position, the valve-stopping mechanism 12 is withdrawn from the access opening 24. It is withdrawn through the open isolation valve assembly 31 into a pressure chamber 33 (identified in FIG. 6b) within the chamber-defining structure 32. Withdrawal of the valve-stopping mechanism 12 into the chamber-defining structure 32 is depicted in FIG. 6c. It is accomplished using a user-operated, moveable component 34 that is part of the valve-servicing assembly 30 The illustrated moveable component 34 is constructed according to known techniques to grip, turn, and withdraw the valve-stopping mechanism 12 under user control.

Figure 6D:
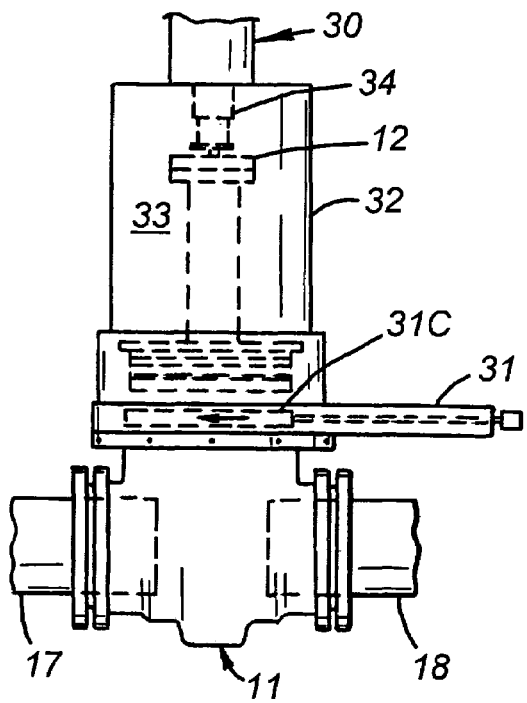

Next, the user closes the isolation valve assembly 31 by moving the gate 31C to the closed position as depicted in FIG. 6d. Doing so isolates the chamber 33 in the chamber-defining structure 32 from the access opening 24 in the valve body 11. With the access opening 24 closed in that manner (i.e., isolated), the user removes the valve-stopping mechanism 12 from the chamber-defining structure 32 for repair or replacement. Before placing a repaired or replacement valve-stopping mechanism back into the chamber-defining structure 32, the user can clean, or resurface the hollow valve body interior 16 (described earlier with reference to FIGS. 2 and 4) through the isolation valve assembly 31 using the moveable component 34 in the chamber-defining structure 32 of the valve servicing assembly 30.

Figure 6E:
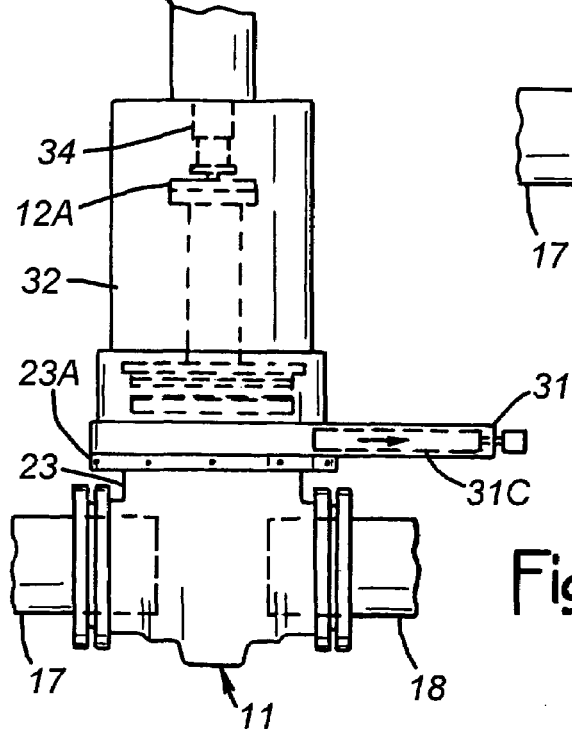
Figure 6F:
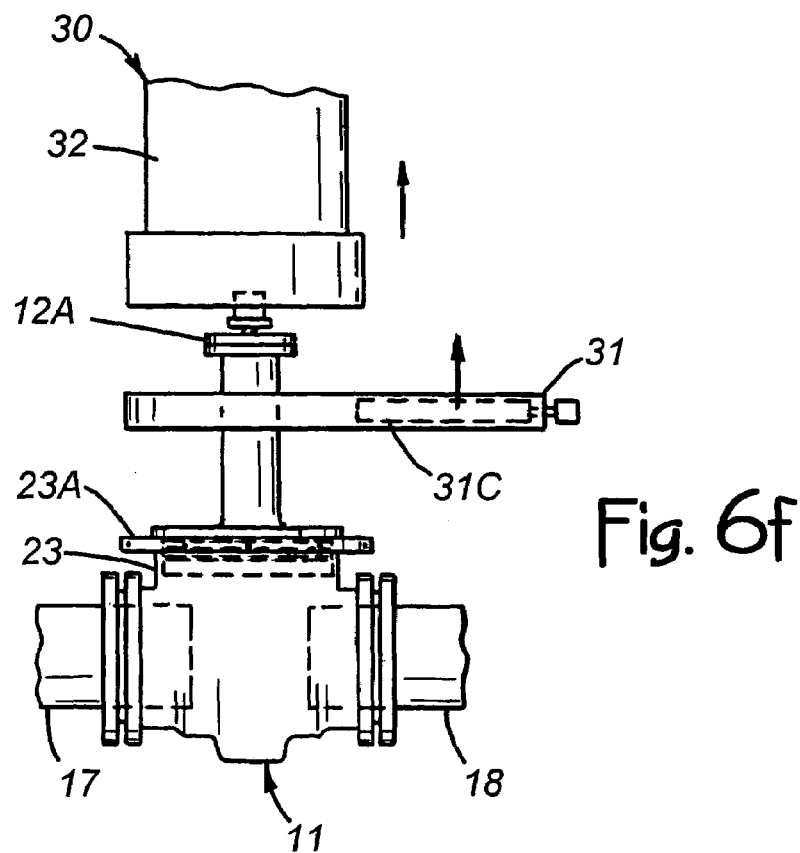
Figure 6G:
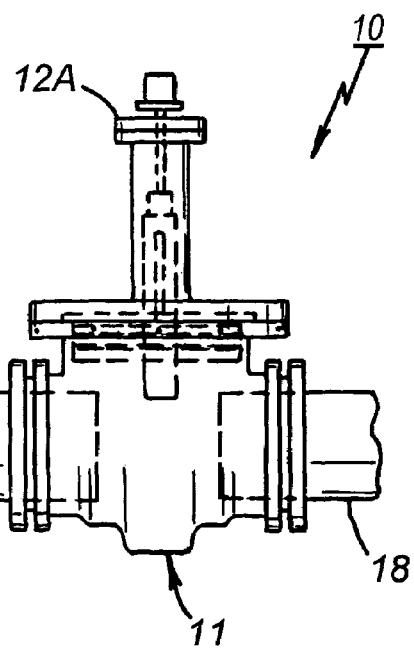

After that, the user places a repaired or replacement valve-stopping mechanism 12A into the chamber-defining structure 32 and opens the isolation valve assembly 31 as depicted in FIG. 6e. The valve-stopping mechanism 12A is then mounted in the access opening 24 defined by the opening-defining portion 23 of the valve body 11 and the valve-servicing assembly 30 is removed as depicted in FIG. 6f. That results in the serviced valve 10 depicted in FIG. 6g without shutting down the line.

With further regard to the valve-servicing assembly 30, the chamber-defining structure 32 may take the form of a modified "completion tool." A completion tool is a known existing tool used for inserting products into pressurized pipeline systems that has been converted with well known methods to include the moveable component 34 that enables the user to grip and remove the valve-stopping mechanism 12 from the access opening 24, to grip and manipulate components for cleaning and resurfacing of the hollow valve body interior 16 of the valve body 11, and to grip and install the valve-stopping mechanism 12A into the access opening 24. It enables the user to do those things under pressurized conditions and it is familiar to one of ordinary skill in the art.

To summarize the above-described methodology, the method is one for repairing under pressure a valve having a valve body, an opening-defining portion of the valve body that defines an access opening, a valve-stopping mechanism removably mounted within the access opening, and means on the opening-defining portion of the valve body for facilitating the connection of a separate isolation valve assembly to the opening-defining portion. The method includes the step of providing a valve-servicing assembly of which the isolation valve assembly is a part such that the isolation valve assembly has first and second ends and a size large enough to enable a user to remove the valve-stopping mechanism from the access opening through the isolation valve assembly, the valve-servicing assembly including a chamber-defining structure connected to the second end of the isolation valve assembly that defines a chamber in which the valve-stopping mechanism fits. The method proceeds by connecting the first end of the isolation valve assembly to the opening-defining portion of the valve body in a position over the access opening, withdrawing the valve-stopping mechanism from the access opening, through the isolation valve assembly, into the fluid-tight chamber, and closing the isolation valve assembly.

In the case of repair, the method also includes the steps of removing the valve-stopping mechanism from the fluid-tight chamber and servicing the valve-stopping mechanism. The method then proceeds by installing a completion tool within the chamber-defining structure, opening the isolation valve, advancing the completion tool into the access opening, and performing cleaning and/or resurfacing of the hollow valve body and the seating area for the valve-stopping mechanism. After that, the method proceeds by retracting the completion tool, closing the isolation valve, placing the valve-stopping mechanism back into the fluid-tight chamber, opening the isolation valve assembly, and advancing the valve-stopping mechanism from the fluid-tight chamber through the isolation valve assembly back into the access opening. In the case of replacement, the method includes the steps of removing the valve-stopping mechanism from the fluid-tight chamber, placing a replacement valve-stopping mechanism into the fluid-tight chamber, cleaning and/or resurfacing as may be needed, opening the isolation valve assembly, and advancing the replacement valve-stopping mechanism from the fluid-tight chamber through the isolation valve assembly into the access opening. In either case, the user may disconnect the first end of the isolation valve assembly from the opening-defining portion of the valve body.

Based upon the foregoing and subsequent descriptions, one of ordinary skill in the art can readily practice the invention and incorporate various changes without departing from the scope of the claims. The valve body, for example, may be manufactured from any of various materials, including ductile iron, cast iron, stainless steel, brass, plastics, and any of various exotic materials needed in special applications. The size can range from ¼-inch diameter or less to a 144-inch diameter or more. In addition, the first and second ends of the valve body configured so that a user can readily connect each end to a respective one of separate first and second pipeline sections, either directly or via intermediate fittings using any of various known connection means, including flanged, mechanical joint, pipe threads, solder, welded ends, compression and push-in fittings, and grooved locking methods including cam locks or bayonet-type locks similar to those used in kitchen blenders, camera lenses, or bolt action rifles. The valve-stopping mechanism may take any of various known forms, including metal gate, rubber coated gate, butterfly, plug, ball, and check valve stopping mechanisms, and the connection-facilitating means may take any of various forms including a flange, a threaded portion, grooved locking methods, machine screw connections, and any of many other known locking means.

FIGS. 7, 8, 9, and 10 illustrate various aspects of a second valve embodiment (a valve 100) that incorporates some of the above-mentioned alternatives. The valve 100 is similar is some general respects to the valve 10 and so only differences will be described in further detail. For convenience, numerals designating parts of the valve 100 are increased by one hundred over numerals designating similar, corresponding, or related parts of the valve 10.

The valve 100 includes a valve body 111 and a valve-stopping mechanism 112 (FIG. 7). They are composed of brass. The valve body 111 has first and second ends 114 and 115 and a hollow interior 116 (FIGS. 8–10) that extends along an axis 113 between the first and second ends 114 and 115. The valve 100 is illustrated with the first and second ends 114 and 115 connected by interior pipe threads 141 and 142 to first and second pipeline sections 117 and 118.

Figure 9:
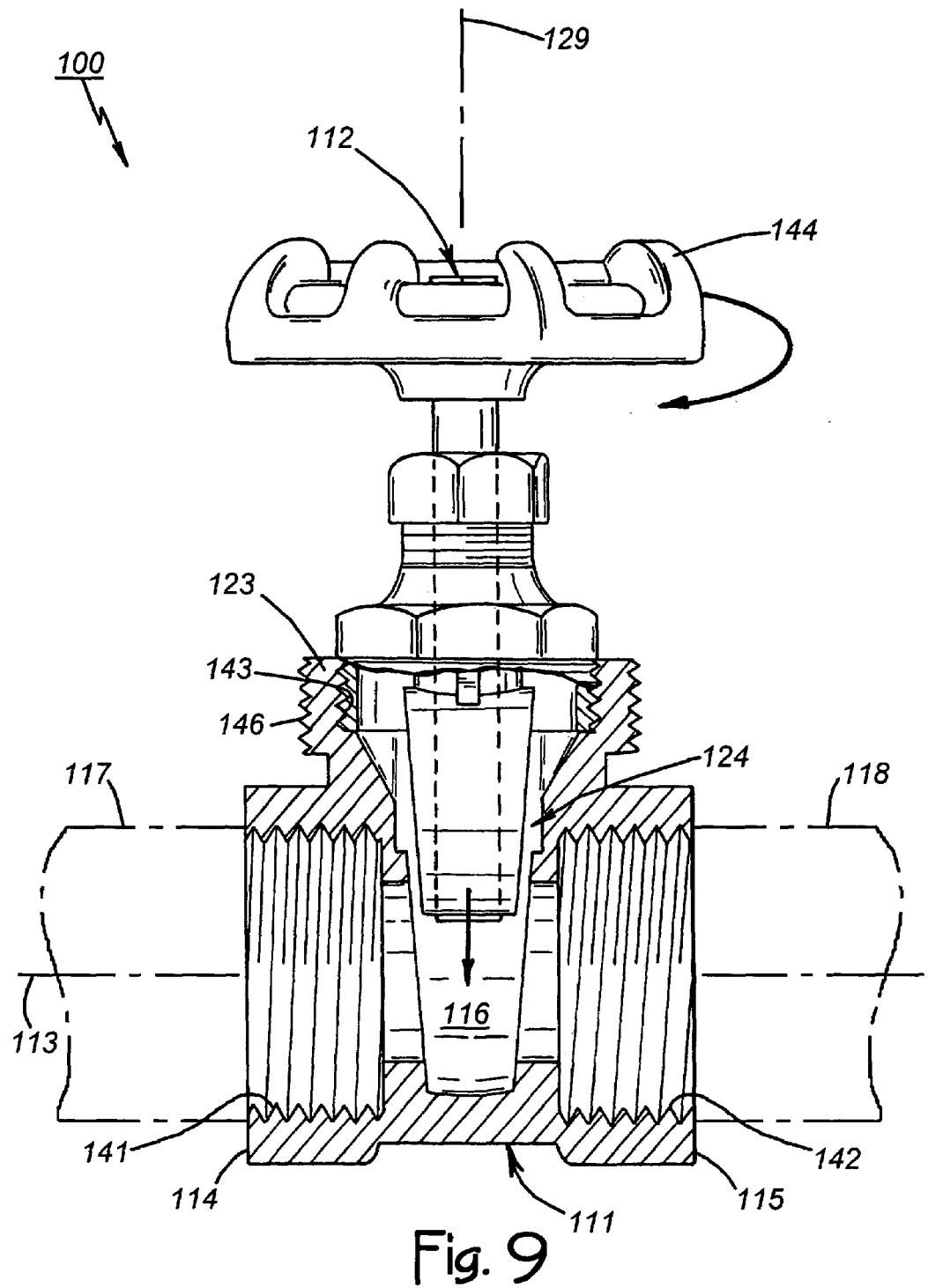
FIG. 9 is an enlarged elevation view similar to FIG. 8, but with the valve-stopping mechanism added.
Figure 10:
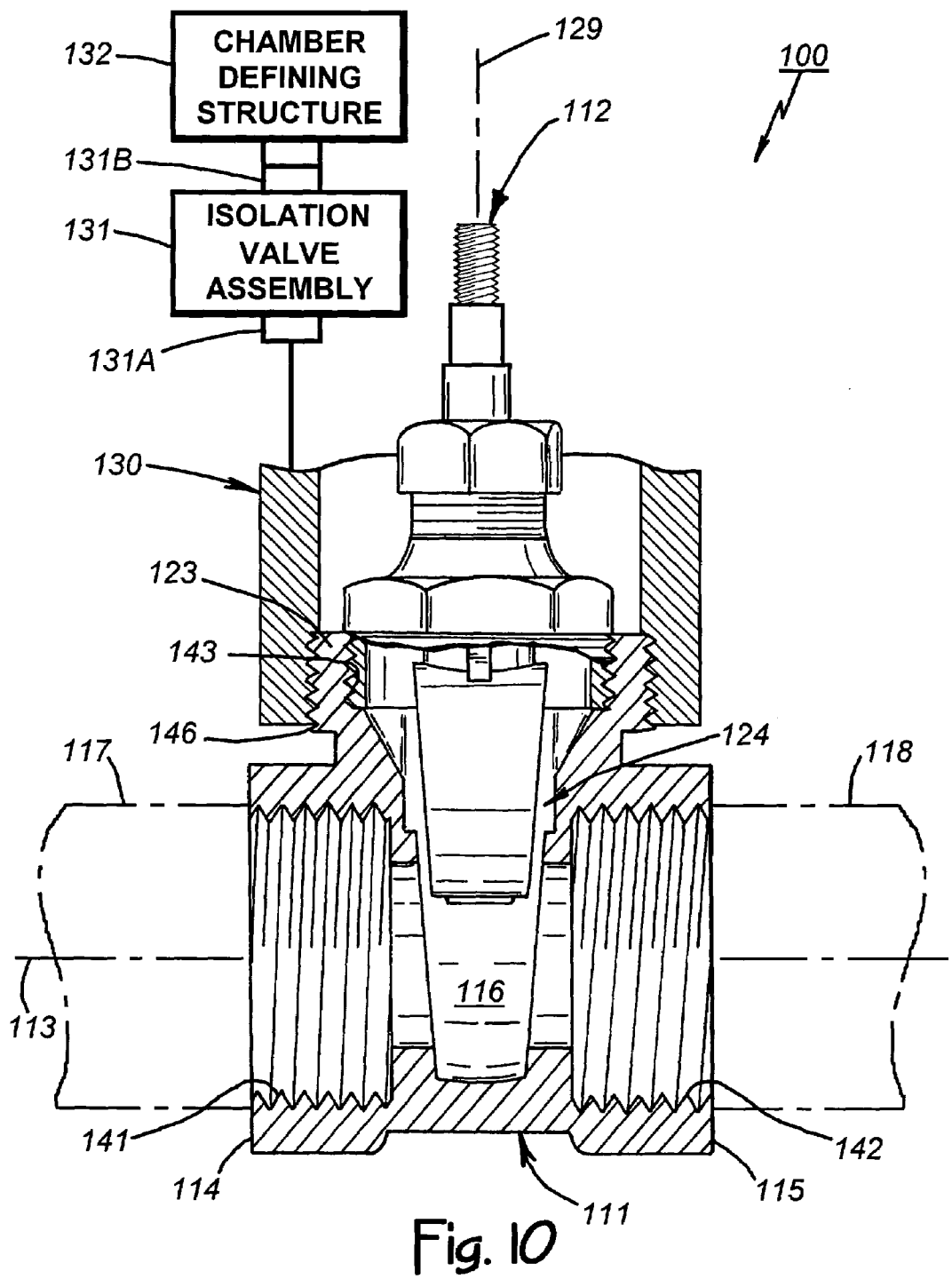
FIG. 10 is another elevation view of the second embodiment with a valve-servicing assembly illustrated diagrammatically connected over the access opening.

The valve body 111 includes an opening-defining portion 123 that defines an access opening 124 (FIGS. 8–10). The valve-stopping mechanism 112 is mounted removably in the access opening 124 by means of an interior thread 143 (FIGS. 8–10) on the opening-defining portion 123 that functions as means for holding or vertically restraining the valve-stopping mechanism 112 within the access opening 124. The user rotates a wheel 144 (FIGS. 7–9) that is held on the valve stopping-mechanism 112 by a nut 145 (FIG. 7) in order to advance and withdraw the valve stopping-mechanism 112 along a rotational axis 129 as depicted by the arrows in FIG. 9. Doing so stops and unstops fluid flow through the valve body 111.

The opening-defining portion 123 of the valve body 111 includes connection-facilitating means in the form of an exterior thread 146 (FIGS. 7–10). The thread 146 functions as means on the opening-defining portion 123 of the valve body 111 for facilitating the fluid-tight removable connection of a separate isolation valve assembly 131 (FIG. 10) to the opening-defining portion 123 of the valve body 111 in a position over the access opening 124 that enables the user to remove the valve-stopping mechanism 112 from the access opening 124 through the isolation valve assembly 131. The isolation valve assembly 131 is part of a valve-servicing assembly 130 that includes a chamber-defining structure 132 (FIG. 10). The isolation valve assembly 131 has a first end 131A that connects to the opening-defining portion 123 using the exterior thread 146, and a second end 131B to which the chamber-defining structure 132 is connected.

Figure 11:
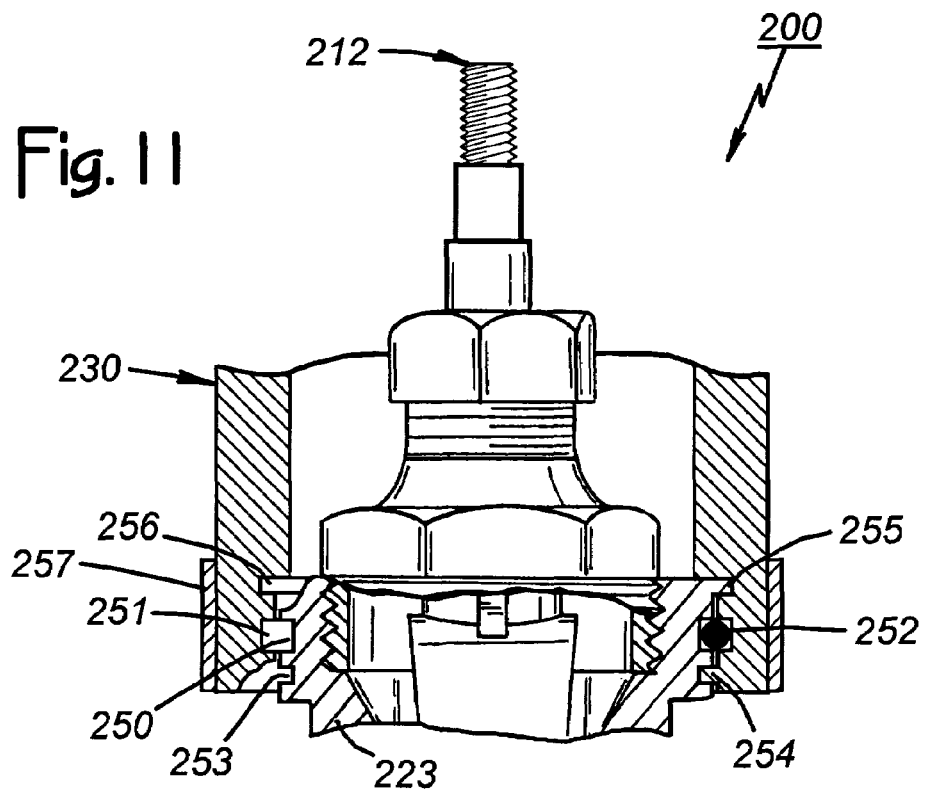
FIG. 11 is an elevation view similar to FIG. 9 of a portion of a third embodiment constructed according to the invention showing various means for facilitating the connection of the valve-servicing assembly.

FIG. 11 illustrates a third embodiment with different connection-facilitating means. It is designated as a valve 200 with a valve-stopping mechanism 212. The valve 200 is similar in many respects to the valve 100 and so only differences will be described in further detail. For convenience, numerals designating parts of the valve 200 are increased by one hundred over numerals designating similar, corresponding, or related parts of the valve 100.

A first connection-facilitating arrangement illustrated by the valve 200 is an annular groove 250 in an opening-defining portion 223 of the valve. The valve-servicing assembly 230 includes an annular groove 251 also. A sealing member 252 (e.g., elastomeric ring) is disposed between the grooves 250 and 251 to effect a fluid-tight seal. The sealing member 252 has been omitted on one side of the opening-defining portion 223 in FIG. 11 for illustrative reasons in order to expose the grooves 250 and 251 for identification. A second connection-facilitating arrangement by the valve 200 is an annular groove 253 in the opening-defining portion 223 that mates with a radially inwardly protruding annular ring 254 of the valve-servicing assembly 230. A portion of the valve-servicing assembly 230 has been broken away in FIG. 11 for illustrative reasons in order to expose the groove 253 for identification. A third connection-facilitating arrangement illustrated by the valve 200 is a radially outwardly protruding annular ring 255 that mates with an annular groove 256 in the valve-servicing assembly 230. A portion of the opening-defining portion 223 in has been broken away for illustrative reasons in order to expose the groove 256 for identification. A compression member 257 applies force radially inwardly to the valve-servicing assembly 230 to help effect a fluid-tight seal.

Figure 12:
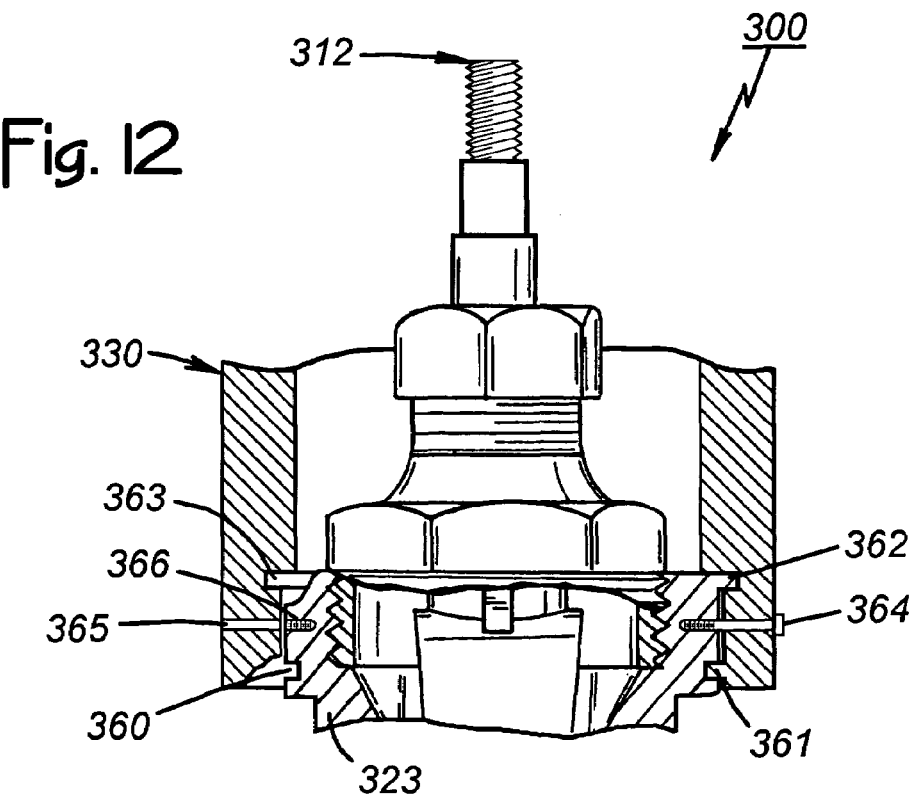
FIG. 12 is an elevation view similar to FIG. 9 of a portion of a fourth embodiment of a valve constructed according to the invention showing a cam lock arrangement for facilitating connection of the valve-servicing assembly.

FIG. 12 illustrates a fourth embodiment with some more different connection-facilitating means. It is designated as a valve 300 with a valve-stopping mechanism 312. The valve 300 is similar in many respects to the valve 200 and so only differences will be described in further detail. For convenience, numerals designating parts of the valve 300 are increased by one hundred over numerals designating similar, corresponding, or related parts of the valve 300.

A first connection-facilitating arrangement illustrated by the valve 300 is a segmented annular groove 360 in an opening-defining portion 323 of the valve 300 that mates with a segmented annular ring 361 in the valve-servicing assembly 330 to form a cam lock. A second connection-facilitating arrangement illustrated by the valve 300 is a segmented annular ring 362 in the opening-defining portion 323 of the valve 300 that mates with a segmented annular groove 363 in the valve-servicing assembly 330 to form a cam lock. A third connection-facilitating arrangement illustrated by the valve 300 is a machine screw 364 that extends through a hole in the valve-servicing assembly 330 (a hole similar to a hole 365 that is identified in FIG. 12 on the opposite side of the valve-servicing assembly 330) into an interiorly threaded hole in the opening-defining portion 323 that is similar to a threaded hole 366 on the opposite side of the opening-defining portion 323.

Thus, the valve and methodology of this invention enables the user to remove the valve-stopping mechanism from the opening-defining portion of the valve being serviced through a separate isolation valve into a pressure chamber for servicing or replacement while the valve being serviced contains fluid under pressure. The valve being serviced includes connection-facilitating means that facilitates connection of the isolation valve so that servicing can proceed without shutting down the line. Although exemplary embodiments have been shown and described, one of ordinary skill in the art may make many changes, modifications, and substitutions without necessarily departing from the spirit and scope of the invention.

What is claimed is:

1. A valve, comprising:
a valve body having first and second ends, the valve body defining a hollow valve body interior extending between the first and second ends that couples the first and second ends in fluid communications;
an opening-defining portion of the valve body that defines an access opening in the valve body;
isolator means for enabling a user to selectively stop and unstop fluid communications between the first and second ends of the valve body, including a valve-stopping mechanism removably mounted within the access opening; and
connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;
wherein the valve body is a one-piece structure.

2. A valve as recited in claim 1, wherein the opening-defining portion of the valve body includes a flange that functions as means for facilitating the connection of the isolation valve assembly to the opening-defining portion of the valve body by bolting.

3. A valve as recited in claim 1, wherein the valve-stopping mechanism is removably mounted within the hollow valve body.

4. A valve, comprising:
a valve body having first and second ends, the valve body defining a hollow valve body interior extending between the first and second ends that couples the first and second ends in fluid communications;
an opening-defining portion of the valve body that defines an access opening in the valve body;
isolator means for enabling a user to selectively stop and unstop fluid communications between the first and second ends of the valve body, including a valve-stopping mechanism removably mounted within the access opening; and
connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;
wherein the opening-defining portion of the valve body includes an exterior thread that functions as means for facilitating the connection of the isolation valve assembly to the opening-defining portion of the valve body by threaded engagement.

5. A valve, comprising:
a valve body having first and second ends, the valve body defining a hollow valve body interior extending between the first and second ends that couples the first and second ends in fluid communications;
an opening-defining portion of the valve body that defines an access opening in the valve body;

isolator means for enabling a user to selectively stop and unstop fluid communications between the first and second ends of the valve body, including a valve-stopping mechanism removably mounted within the access opening; and connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;

wherein the opening-defining portion of the valve body includes at least one annular groove that functions as means for facilitating the connection of the isolation valve assembly to the opening-defining portion of the valve body with a sealing member between the isolation valve assembly and the opening-defining portion.

6. A valve, comprising:

a valve body having first and second ends, the valve body defining a hollow valve body interior extending between the first and second ends that couples the first and second ends in fluid communications;

an opening-defining portion of the valve body that defines an access opening in the valve body;

isolator means for enabling a user to selectively stop and unstop fluid communications between the first and second ends of the valve body, including a valve-stopping mechanism removably mounted within the access opening; and connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;

wherein the opening-defining portion of the valve body includes at least one annular groove that functions as means for facilitating connection of the isolation valve assembly to the opening-defining portion of the valve body with a mating annular ring on the isolation valve assembly.

7. A valve, comprising:

a valve body having first and second ends, the valve body defining a hollow valve body interior extending between the first and second ends that couples the first and second ends in fluid communications;

an opening-defining portion of the valve body that defines an access opening in the valve body;

isolator means for enabling a user to selectively stop and unstop fluid communications between the first and second ends of the valve body, including a valve-stopping mechanism removably mounted within the access opening; and connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;

wherein the opening-defining portion of the valve body includes at least one annular ring that functions as means for facilitating the connection of the isolation valve assembly to the opening-defining portion of the valve body with a mating annular groove on the isolation valve assembly.

8. A valve, comprising:

a valve body having first and second ends, the valve body defining a hollow valve body interior extending between the first and second ends that couples the first and second ends in fluid communications;

an opening-defining portion of the valve body that defines an access opening in the valve body;

isolator means for enabling a user to selectively stop and unstop fluid communications between the first and second ends of the valve body, including a valve-stopping mechanism removably mounted within the access opening; and connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;

wherein the opening-defining portion of the valve body includes at least one segmented annular groove that functions as means for facilitating connection of the isolation valve assembly to the opening-defining portion of the valve body with a mating segmented annular ring on the isolation valve assembly in a cam lock engagement.

9. A valve, comprising:

a valve body having first and second ends, the valve body defining a hollow valve body interior extending between the first and second ends that couples the first and second ends in fluid communications;

an opening-defining portion of the valve body that defines an access opening in the valve body;

isolator means for enabling a user to selectively stop and unstop fluid communications between the first and second ends of the valve body, including a valve-stopping mechanism removably mounted within the access opening; and connection-facilitating means on the opening-defining portion of the valve body for facilitating the fluid-tight removable connection of a separate isolation valve assembly to the opening-defining portion of the valve body in a position over the access opening that enables the user to remove the valve-stopping mechanism from the access opening through the isolation valve assembly;

wherein the opening-defining portion of the valve body includes at least one segmented annular ring that functions as means for facilitating the connection of the isolation valve assembly to the opening-defining portion of the valve body with a mating segmented annular groove in the isolation valve assembly in a cam lock engagement.

10. A valve, comprising:

a valve body having first and second ends, the valve body defining a hollow valve body interior extending between the first and second ends that couples the first and second ends in fluid communications;

an opening-defining portion of the valve body that defines an access opening in the valve body; and connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;

wherein the valve body is a one-piece structure.

11. A valve as recited in claim 10, wherein the opening-defining portion of the valve body includes a flange that functions as means for facilitating the connection of the isolation valve assembly to the opening-defining portion of the valve body by bolting.

12. A valve as recited in claim 10, wherein the valve-stopping mechanism is installed into the hollow valve body through the isolation valve assembly.

13. A valve, comprising:

a valve body having first and second ends, the valve body defining a hollow valve body interior extending between the first and second ends that couples the first and second ends in fluid communications;

an opening-defining portion of the valve body that defines an access opening in the valve body; and connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;

wherein the opening-defining portion of the valve body includes an exterior thread that functions as means for facilitating the connection of the isolation valve assembly to the opening-defining portion of the valve body by threaded engagement.

14. A valve, comprising:

a valve body having first and second ends, the valve body defining a hollow valve body interior extending between the first and second ends that couples the first and second ends in fluid communications;

an opening-defining portion of the valve body that defines an access opening in the valve body; and connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;

wherein the opening-defining portion of the valve body includes an exterior thread and at least one annular O-ring groove that functions as means for facilitating the connection of the isolation valve assembly to the opening-defining portion of the valve body by threaded and compressed rubber engagement.

15. A valve, comprising:

a valve body having first and second ends, the valve body defining a hollow valve body interior extending between the first and second ends that couples the first and second ends in fluid communications;

an opening-defining portion of the valve body that defines an access opening in the valve body; and connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;

wherein the opening-defining portion of the valve body includes an exterior thread and at least one receiving O-ring surface that functions as means for facilitating the connection of the isolation valve assembly to the opening-defining portion of the valve body by threaded and compressed rubber engagement.

16. A valve, comprising:

a valve body having first and second ends, the valve body defining a hollow valve body interior extending between the first and second ends that couples the first and second ends in fluid communications;

an opening-defining portion of the valve body that defines an access opening in the valve body; and connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;

wherein the opening-defining portion of the valve body includes at least one annular groove that functions as means for facilitating the connection of the isolation valve assembly to the opening-defining portion of the valve body with a sealing member between the isolation valve assembly and the opening-defining portion.

17. A valve, comprising:

a valve body having first and second ends, the valve body defining a hollow valve body interior extending between the first and second ends that couples the first and second ends in fluid communications;

an opening-defining portion of the valve body that defines an access opening in the valve body; and connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;

wherein the opening-defining portion of the valve body includes at least one annular groove that functions as means for facilitating connection of the isolation valve assembly to the opening-defining portion of the valve body with a mating annular ring on the isolation valve assembly.

18. A valve, comprising:

a valve body having first and second ends, the valve body defining a hollow valve body interior extending between the first and second ends that couples the first and second ends in fluid communications;

an opening-defining portion of the valve body that defines an access opening in the valve body; and connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;

wherein the opening-defining portion of the valve body includes at least one annular ring that functions as means for facilitating the connection of the isolation valve assembly to the opening-defining portion of the valve body with a mating annular groove on the isolation valve assembly.

19. A valve, comprising:
a valve body having first and second ends, the valve body defining a hollow valve body interior extending between the first and second ends that couples the first and second ends in fluid communications;
an opening-defining portion of the valve body that defines an access opening in the valve body; and
connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;
wherein the opening-defining portion of the valve body includes at least one segmented annular groove that functions as means for facilitating connection of the isolation valve assembly to the opening-defining portion of the valve body with a mating segmented annular ring on the isolation valve assembly in a cam lock engagement.

20. A valve, comprising:
a valve body having first and second ends, the valve body defining a hollow valve body interior extending between the first and second ends that couples the first and second ends in fluid communications;
an opening-defining portion of the valve body that defines an access opening in the valve body; and
connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;
wherein the opening-defining portion of the valve body includes at least one segmented annular ring that functions as means for facilitating the connection of the isolation valve assembly to the opening-defining portion of the valve body with a mating segmented annular groove in the isolation valve assembly in a cam lock engagement.

21. A valve, comprising:
a valve body having first and second ends, the valve body defining a hollow valve body interior extending between the first and second ends that couples the first and second ends in fluid communications;
an opening-defining portion of the valve body that defines an access opening in the valve body; and
connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;
wherein the opening-defining portion of the valve body includes an interior thread that functions as means for facilitating the connection under pressure of the valve-stopping mechanism to the opening-defining portion of the valve body by threaded engagement.

22. A valve, comprising:
a valve body having first and second ends, the valve body defining a hollow valve body interior extending between the first and second ends that couples the first and second ends in fluid communications;
an opening-defining portion of the valve body that defines an access opening in the valve body; and
connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;
wherein the opening-defining portion of the valve body includes an interior thread that functions as means for restraining the connection under pressure of the valve-stopping mechanism to the opening-defining portion of the valve body by threaded engagement and as means for allowing at least one O-ring sealing surface in the opening-defining portion.

23. A valve, comprising:
a valve body having first and second ends, the valve body defining a hollow valve body interior extending between the first and second ends that couples the first and second ends in fluid communications;
an opening-defining portion of the valve body that defines an access opening in the valve body; and
connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;
wherein the opening-defining portion of the valve body includes at least one actuating member which includes threads formed thereon and threadedly mounted in said opening-defining portion so that when activated moves into and out of engagement of the valve-stopping mechanism.

24. A valve, comprising:
a valve body having first and second ends, the valve body defining a hollow valve body interior extending between the first and second ends that couples the first and second ends in fluid communications;
an opening-defining portion of the valve body that defines an access opening in the valve body; and
connection-facilitating means on the opening-defining portion of the valve body for facilitating the fluid-tight removable connection of a separate isolation valve assembly to the opening-defining portion of the valve body in a position over the access opening that enables the user to install a valve-stopping mechanism into the access opening through the isolation valve assembly;
further comprising at least one segment-engaging element coupled to said segment and slidably mounted in the opening-defining portion of the valve body for engaging and locking said segment in position to restrain the valve-operating mechanism and at least one actuating member including threads formed thereon and threadedly mounted in said opening-defining portion for slidingly actuating said segment engaging member for moving said segment into and out of engagement of the valve-stopping mechanism.

* * * * *